United States Patent [19]

Marino

[11] 4,156,254

[45] May 22, 1979

[54] POWER LINE SYNCHRONIZATION OF CRT RASTER SCAN

[75] Inventor: Francis C. Marino, Dix Hills, N.Y.

[73] Assignee: Burroughs Corporation, Detroit, Mich.

[21] Appl. No.: 659,563

[22] Filed: Feb. 19, 1976

[51] Int. Cl.² .................... H04N 5/06; G06K 15/20
[52] U.S. Cl. .................................... 358/150; 340/814; 331/21
[58] Field of Search ................ 331/21; 340/324 AD; 178/69.5 G, 69.5 TV; 358/150, 158, 148, 149, 242, 217; 328/187

[56] References Cited

U.S. PATENT DOCUMENTS

| | | | |
|---|---|---|---|
| 3,006,995 | 10/1961 | Fathauer | 178/69.5 G |
| 3,526,715 | 9/1970 | Cagle et al. | 358/150 |
| 3,598,911 | 8/1971 | Helbig | 340/324 AD |
| 3,777,063 | 12/1973 | Meacham | 358/150 |
| 3,916,402 | 10/1975 | Hornung | 178/69.5 TV |
| 4,012,592 | 3/1977 | Ricard | 358/150 |

OTHER PUBLICATIONS

Kiver, *Television Simplified*, Van Nostrand, 1973, p. 313.

Primary Examiner—John C. Martin
Attorney, Agent, or Firm—Hane, Roberts, Spiecens & Cohen

[57] ABSTRACT

In a cathode ray tube (CRT) display system using a horizontal line raster scan, the vertical sync signals are derived from the power line alternating current while the vertical blanking signals to blank the vertical retraces between rasters are timed to occur over an interval which starts before a vertical sync signal and ends a period of time after the vertical sync signal which is no less than the minimum time required for a vertical retrace.

11 Claims, 2 Drawing Figures

POWER LINE SYNCHRONIZATION OF CRT RASTER SCAN

BACKGROUND OF THE INVENTION

This invention pertains to cathode ray tube (CRT) displays and more particularly to the generation of the synchronizing (sync) signals and blanking signals used in generating the raster scans of such displays.

It is common knowledge among designers of CRT display terminals that the vertical sweep rate of the display should be synchronized with the frequency of the power line. This follows from the fact that magnetic fields emanating from power supply transformers, flourescent fixtures, etc., invariably are in sufficient proximity to the display so as to affect the average position of the electron beam of the display. The overall effect is one in which the linearity of the display varies at a frequency equal to the difference between the sweep rate and the instantaneous power line frequency. This "slow motion" variation of the display is eliminated when the sweep rate of the display is synchronized to the instantaneous frequency of the interferring magnetic fields at the power line frequency.

A common method of achieving the required synchronization is through the use of phase-locked loop circuits in which a voltage controlled oscillator (VCO), operating at megahertz frequencies required by the system logic, is divided down to approximate the power line frequency (50 or 60 Hz.). This approximated frequency is then compared against the actual power line alternating current signal serving as the reference frequency in a phase detector. The phase detector generates an "error" signal which is used to adjust the VCO frequency such that the frequency divided down from the voltage controlled oscillator is synchronized to the power line frequency. Apart from being relatively expensive, this method requires some delicacy in design to insure that the circuits reestablish synchronization should strong noise force the phase-locked loop to temporarily lose control.

In addition phase-locked loop circuits operate over narrow ranges of the reference or power line frequency. Thus if a circuit is designed for 60 Hz alternating current power lines it cannot be used for 50 Hz power lines and one must design a new circuit.

SUMMARY OF THE INVENTION

It is accordingly a prime object of the invention to provide improved synchronization of CRT rasters to power line frequency signals.

It is another object of the invention to eliminate the more costly phase-locked loop circuits which utilize voltage-controlled oscillators, divide-down counters and phase detectors.

It is another object of the invention to provide a method and apparatus for synchronizing to a maximum power frequency as well as all frequencies below such maximum frequency.

Briefly, according to the invention there is contemplated in a cathode ray tube display system which is energized by a power line supplying alternating current having a period of n seconds and which creates a horizontal line raster by utilizing horizontal-and-vertical sync signals and which requires a minimum vertical blanking interval of p seconds for each vertical retrace time between rasters, where p is less than n, the synchronizing of the vertical sweep rate of the system to the frequency of the alternating current by generating horizontal sync signals, generating, in response to the alternating current a vertical sync signal during each period of the alternating current, and for each vertical sync signal generating a vertical blanking signal having a duration greater than p seconds which starts before the next occuring vertical sync signal and ends no less than p seconds after such next occurring vertical sync signal.

BRIEF DESCRIPTION OF THE INVENTION

Other objects, the features and advantages of the invention will be apparent from the following detailed description when read with the accompanying drawing which shows by way of example and no limitation apparatus for practicing the invention.

DESCRIPTION OF THE PREFERRED EMBODIMENT

Figure 1:
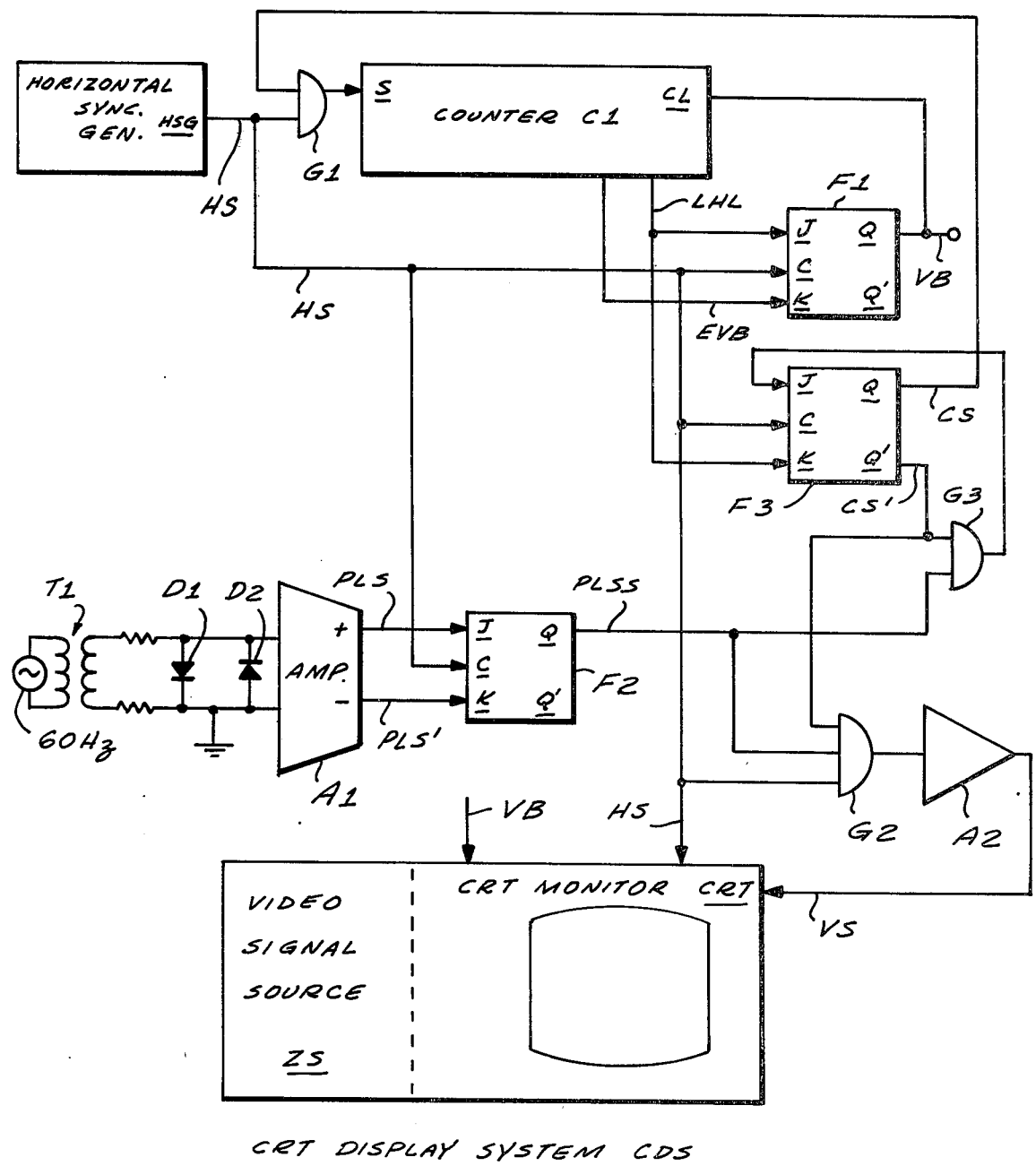
FIG. 1 is a block diagram of a CRT display system utilizing the invention.

Before describing the apparatus for performing the invention, an example of the gist of the invention wll be given. Assume the field rate is the same as the power line frequency of 60 Hz. Then the power line synchronized vertical sync period will be 1/60 sec. or 16.67 ms. And assume that the nature of the vertical drive circuits of the CRT display require a minimum vertical blanking interval for interraster retrace of 0.96 ms. Now, in order to obtain power line synchronization, the vertical blanking interval for the retrace at the end of the field should commence slightly earlier than 16.67 ms after the preceding vertical sync pulse which initiated that field. Assume it should commence 16.5 ms after the preceding vertical sync pulse. Thus, the vertical blanking signal is started 16.5 ms after the preceding vertical sync pulse and remains on until 0.96 ms after the next sync pulse. In this way it is assured that the blanking is present at least for its required time. In fact, the blanking is longer. If at the same time the vertical sync pulses are generated directly from the power line, the raster rate is synchronized to the power line frequency with any possible jitter occurring during the blanking interval.

The invention will be described with reference to FIGS. 1 and 2. It should be noted that the names of the signals and the lines and/or outputs carrying the signals have the same reference characters. For example signals HS are on the HS signal line.

Figure 2:
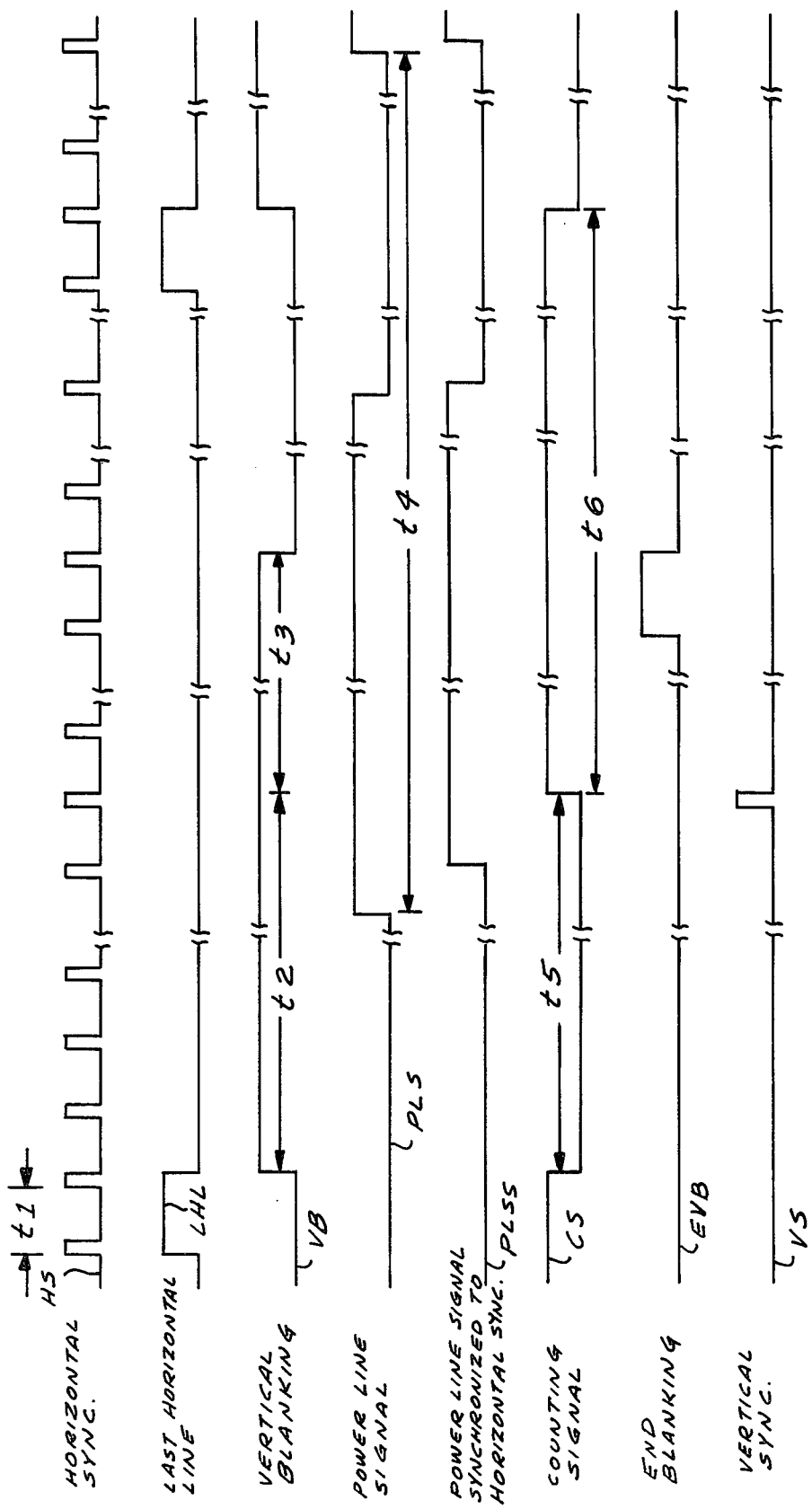
FIG. 2 are waveforms at particular points in the system of FIG. 1.

In FIG. 1 there is shown a CRT display system CDS comprising a CRT monitor CRT which receives video signals from video signal source ZS and horizontal-and-vertical sync signals as well as vertical blanking signals from their respective sources.

The horizontal sync signals as shown on line HS are generated by a horizontal sync generator HGS which can include a free running oscillator. In a typical system using a 512 line non-interlaced raster the pulse duration can be 30 $\mu$sec. and the repetition rate of 33.3 Khz. The vertical blanking signal VB is generated by a bistate circuit in the form of JK-flip-flop F1 having control inputs J and K receiving first and second control signals on similarly referenced lines EVB and LHL from a timing circuit. The timing circuit includes a pulse counter C1 which has a clear input CL connected to line VB and a count input S connected to the output of two-input AND-circuit G1. The first input of circuit G1 is connected via line HS to the output of horizontal sync generator HSG, and the second input thereof is connected to line CS. Within the counter C1 there can be a decoder connected to line EVB such that line EVB receives a pulse when the counter has accumulated a count of thirty two. Similarly, there can be another decoder connected to line LHL such that line LHL receives a pulse when the counter has accumulated a count of 512.

The vertical sync signals VS are generated by amplifier A2 in synchronism with the power line frequency. The power line is represented by the generator 60Hz which is coupled via transformer T1 to the input of amplifier A1. Connecting the input of the amplifier A1 to ground are two parallel diodes D1 and D2 of semi conductor material which are oppositely polarized. The nature of the diodes in such that they begin to conduct after a fraction of a volt of forward bias is present. The diodes shape the 60 Hz sinusoidal waveform into a 60 Hz square waveform. This waveform after amplification is fed via line PLS' to the J-input, and after ampification and inversion via line PLS to the K-input of JK-flip-flop F2. JK flip-flop F2 and all other shown JK flip-flops have a clock input C which is connected to line HS so that the flip-flops change state in synchronizism with the horizontal sync signals HS. The Q-output of flip-flop F2 is fed via line PLSS to one input of three input AND-circuit G2 whose second input is connected to line LHL and whose output is connected to amplifier A2. The third input is connected to the Q' output of flip-flop F3.

The control of the time of generation of the vertical sync pulses as derived from the power line signals as well as when the counter C1 counts horizontal sync signals is performed by JK-flip-flop F3 having: a J-input connected to the output of two-input AND-circuit G3 whose inputs are connected to lines CS' and PLSS; and K-input connected to line LHL; a Q-output connected to line CS; and a Q'-output connected to line CS'.

The operation of the apparatus is as follows: The horizontal sync signals HS are free running with a period t1 of 30 μsec. By free running herein means they are unsynchronized to any other signals of the shown system with the possible exception of signals in the video signal source. In fact they are the clock for the VB and VS signal generators.

At some time the counter C1 reaches a count of 512 associated with the last visible line of the raster. At that time it transmits a signal on the line LHL which when the next HS signal occurs sets flip-flop F1, initiating the generating of the vertical blanking signal VB, and resets the flip-flop F3, terminating the CS signal and initiating the CS' signal. The leading edge of the VB signal clears the counter C1 to an initial value of zero. When counter C1 is reset, signal LHL terminates.

Conditions are such that the counter C1 remains with a zero count because the absence of CS signal at AND-circuit G1 prevents passage of HS signals to the counter. In addition, the presence of CS' signal alerts AND-circuits G2 and G3. The system now enters the wait interval (t2 or t5 of FIG. 2) until a vertical sync signal VS is generated. Sometime during the wait interval the power line signal PLS goes high which sets the flip-flop F2 at the next horizontal sync signal HS causing the generation of the PLSS signal. The PLSS signal slong with the CS' signal causes the still next horizontal sync signal HS to pass through AND-circuit G2 to become the vertical sync signal VS. At the same time flip-flop F3 is set initiating the CS signal and terminating the CS' signal. AND-circuits G2 and G3 are blocked and AND-circuit G1 opened. The counter now starts counting. When it reaches a count of 32 equal to the retrace time of 0.96 ms for the example cited it emits an end of vertical blanking pulse on line EVB which rests flip-flop F1 terminating the VB signal.

At approximately 8.30 ms after the vertical sync pulse, the signals on the outputs of amplifier A1 reverse polarity resetting the flip-flop F2 terminating the signal on line PLSS.

In order to synchronize the video signal source ZS to the raster the signals on lines VS and HS supply the vertical and horizontal sync signals for the video signal source ZS. On the other hand if the video signal source ZS generates the horizontal sync signals for the overall system then it is only necessary to feed the signals on line VS to the source ZS. Finally when the count in the counter C1 reaches the count of 512 approximately equal to 15.4 ms another signal on line LHL is generated and the cycle will repeat.

It should be noted that all values are given merely by way of example for use with 60 Hz power lines. If one designs the system of 50 Hz power lines then the raster period would be 20 ms, in such case there will only be a longer wait period between the end of the last line of the raster and the vertical sync signal. Thus, the same circuit can be used with either U.S. power lines or European power lines.

Although the alternating current from the power line is shown taken via a transform T1, in practice one would obtain such alternating current from the filament transformer of the cathode ray tube of the monitor.

While only one embodiment of the invention has been shown and described in detail, there will now be obvious to those skilled in the art many modifications and variations satisfying many or all of the objects of the invention but which do not depart from the spirit thereof as defined by the appended claims.

What is claimed is:

1. In a cathode ray tube display system which is energized by power line supplying alternating current having a frequency of 1/n Hz and a period of n seconds, which creates a horizontal line raster by utilizing horizontal sync signals and vertical sync signals, and which requires a minimum vertical blanking interval of p seconds for each vertical retrace time (p being less than n), the method of synchronizing the vertical sweep rate of the display system to the frequency of the alternating current comprising the steps generating unsynchronized horizontal sync signals, generating, in response to the alternating current, a vertical sync signal during each period of the alternating current, and for each vertical sync signal generating a vertical blanking signal having a duration greater than p seconds and which starts before the next occurring vertical sync signal and ends no less than p seconds after said next vertical sync signals.

2. The method of claim 1 wherein the vertical sync signals are synchronized to the horizontal sync signals.

3. The method of claim 1 wherein the vertical blanking signals are synchronized to the horizontal sync signals.

4. The method of claim 1 wherein the period of time from the end of one vertical blanking signal to the start of the next vertical blanking signal plus the time for said minimum vertical blanking interval is less than the period of time for one cycle of the alternating current.

5. In a cathode ray tube display system which creates a horizontal line raster by utilizing horizontal and vertical sync signals and which requires a vertical blanking signal having a minimum duration of p seconds for each vertical retrace time occurring between rasters, apparatus for generating said signals comprising: a free running source of horizontal sync signals; a source of power line alternating current, said alternating current having a period of n seconds; a bistate source of vertical blanking signals, said bistate source having an output for transmitting the vertical blanking signals, a first input which upon receipt of a first control signal assumes a first state wherein the output does transmit a vertical blanking signal, and upon receipt of a second control signal assumes a second state wherein said output does not transmit a vertical blanking signal; vertical sync signal generating means connected to said source of power line alternating current for generating a vertical sync signal during each cycle of the alternating current; and timing means responsive to the power line alternating current for alternately generating said first and second control signals, the time between the occurrence of a first control signal and a second control signal being more than p seconds, and a vertical sync signal occurring after a first control signal and before a second control signal so that a vertical sync signal occurs during the presence of a vertical blanking sync.

6. The apparatus of claim 5 wherein said timing means is responsive to said horizontal sync signals.

7. The apparatus of claim 6 wherein said timing means includes a counter means having a counting input connected to said source of horizontal sync signals for counting horizontal sync signals, a first output for emitting said first control signal when a first count is counted by said counter means, a second output for emitting said second control signal when a second and greater count is counted by said counter means, and a control input responsive to said alternating current for controlling the start of the counting of the horizontal sync signals.

8. The apparatus of claim 7 further comprising synchronizing means responsive to said alternating current, said horizontal sync signals and said first control signals for initiating the generation of a vertical sync signal by said vertical sync signal generating means and for activating said control input of said counter means to start counting horizontal sync signals.

9. A method for synchronizing the raster scan of a display device with the frequency of an alternating current power source powering the display device comprising the steps of generating control signals using a pulse driven counter the contents of which are decoded by a decoder to provide said control signals, generating synchronization pulses responsve to said control signals, interrupting the counting sequence of said counter responsive to a predetermined count in said counter, generating a pulse in response to each cycle of said power source, enabling said counter to continue its counting sequence responsive to said pulse, and generating each raster scan signal for said display device in response to each synchronization pulse.

10. A display system for displaying symbols on a display device that exhibits a scan-line raster, said display system including a circuit for controlling the generation of signals for the display of symbols on said device comprising:

means for generating a plurality of pulses;

means for counting said pulses;

decoder means responsive to the count in said counting means to define the scan line raster, and said decoder means generating a set signal for indicating a complete raster scan on said display device;

latching means which is set to a first state in response to the set signal to disable said counting means from counting further, and which is set to a second state in response to a reset signal to reenable said counting means to count in response to said pulses, whereby another complete raster scan is performed; and means for generating a reset signal in response to each cycle of an alternating current power source providing power to said display system.

11. The display system in accordance with claim 10 wherein said counting means comprises a plurality of counter stages, said latching means disabling some of said counter stages when in said first state and said latching means reenabling said some of said counter stages when in said second state.

* * * * *